(12) United States Patent
Drewes et al.

(10) Patent No.: US 10,330,547 B2
(45) Date of Patent: Jun. 25, 2019

(54) PRESSURE MEASURING DEVICE

(71) Applicant: Endress + Hauser GmbH + Co. KG, Maulburg (DE)

(72) Inventors: Ulfert Drewes, Mullheim (DE); Nils Ponath, Freiburg (DE); Michael Hugel, Lorrach (DE); Thomas Uehlin, Schopfheim (DE)

(73) Assignee: ENDRESS+HAUSER SE+CO.KG, Maulburg (DE)

( * ) Notice: Subject to any disclaimer, the term of this patent is extended or adjusted under 35 U.S.C. 154(b) by 170 days.

(21) Appl. No.: 14/395,848

(22) PCT Filed: Mar. 19, 2013

(86) PCT No.: PCT/EP2013/055630
§ 371 (c)(1),
(2) Date: Oct. 21, 2014

(87) PCT Pub. No.: WO2013/160019
PCT Pub. Date: Oct. 31, 2013

(65) Prior Publication Data
US 2015/0122040 A1 May 7, 2015

(30) Foreign Application Priority Data

Apr. 24, 2012 (DE) .................. 10 2012 103 585

(51) Int. Cl.
*G01L 9/00* (2006.01)
(52) U.S. Cl.
CPC .................. *G01L 9/0072* (2013.01)
(58) Field of Classification Search
CPC ....... G01L 9/0072; G01L 7/00; G01L 9/0042; G01L 9/0048; G01L 9/005; G01L 9/0041;
(Continued)

(56) References Cited

U.S. PATENT DOCUMENTS 4,370,890 A * 2/1983 Frick .................. G01L 13/025
361/283.4
4,753,109 A 6/1988 Zabler
(Continued)

FOREIGN PATENT DOCUMENTS

| CN | 101512314 A | 8/2009 |
|---|---|---|
| CN | 101960277 A | 1/2011 |

(Continued)

OTHER PUBLICATIONS

English translation of the International Preliminary Report on Patentability, WIPO, Geneva, dated Nov. 6, 2014.
(Continued)

*Primary Examiner* — Xin Y Zhong
(74) *Attorney, Agent, or Firm* — Bacon & Thomas PLLC

(57) ABSTRACT

A pressure measuring device, comprising: a pressure measuring cell having a measuring membrane, at least one platform and a pressure chamber formed therebetween. An electrical transducer for transducing a deflection of the measuring membrane into a pressure dependent, primary signal; a cylindrical housing having a measuring cell chamber, in which the pressure measuring cell is arranged, and an end face pressure receipt opening in communication with the pressure duct; and an electronic circuit in the housing for operating the electrical transducer, and for processing the primary signal, and for outputting a measurement signal. The cylinder axis of the pressure measuring cell forms with the cylinder axis of the housing an angle, which amounts to not less than 80°, and which is especially preferably a right angle.

11 Claims, 2 Drawing Sheets

(58) Field of Classification Search
CPC . G01L 7/02; G01L 7/022; G01L 7/024; G01L 7/04; G01L 7/041; G01L 7/043; G01L 7/06; G01L 7/061; G01L 7/08; G01L 7/082; G01L 7/163; G01L 9/0001; G01L 9/0005; G01L 9/0026; G01L 9/003; G01L 9/0058; G01L 13/025; G01L 13/026; G01L 13/02; G01L 13/021; G01L 13/023; G01L 13/028; A61H 2201/5071; G01F 1/383

See application file for complete search history.

(56) References Cited

U.S. PATENT DOCUMENTS

| | | | |
|---|---|---|---|
| 4,987,783 A | | 1/1991 | D'Antonio |
| 6,295,875 B1 | * | 10/2001 | Frick ................. G01L 9/0072 73/718 |
| 6,715,356 B2 | | 4/2004 | Gerst |
| 8,033,179 B2 | | 10/2011 | Lopatin |
| 2001/0015105 A1 | * | 8/2001 | Gerst ................. G01L 9/0075 73/715 |
| 2009/0212899 A1 | | 8/2009 | Gross |

FOREIGN PATENT DOCUMENTS

| | | |
|---|---|---|
| CN | 102215639 A | 10/2011 |
| DE | 3616308 C2 | 11/1987 |
| DE | 102004051219 A1 | 5/2006 |
| EP | 0356482 B1 | 3/1990 |
| EP | 1128172 B1 | 8/2001 |

OTHER PUBLICATIONS

German Search Report, German Patent Office, Munich, dated Sep. 12, 2012.

International Search Report, EPO, The Netherlands, dated Jan. 27, 2014.

* cited by examiner

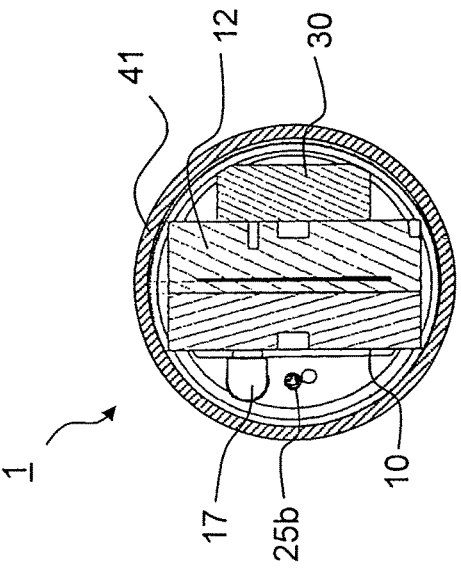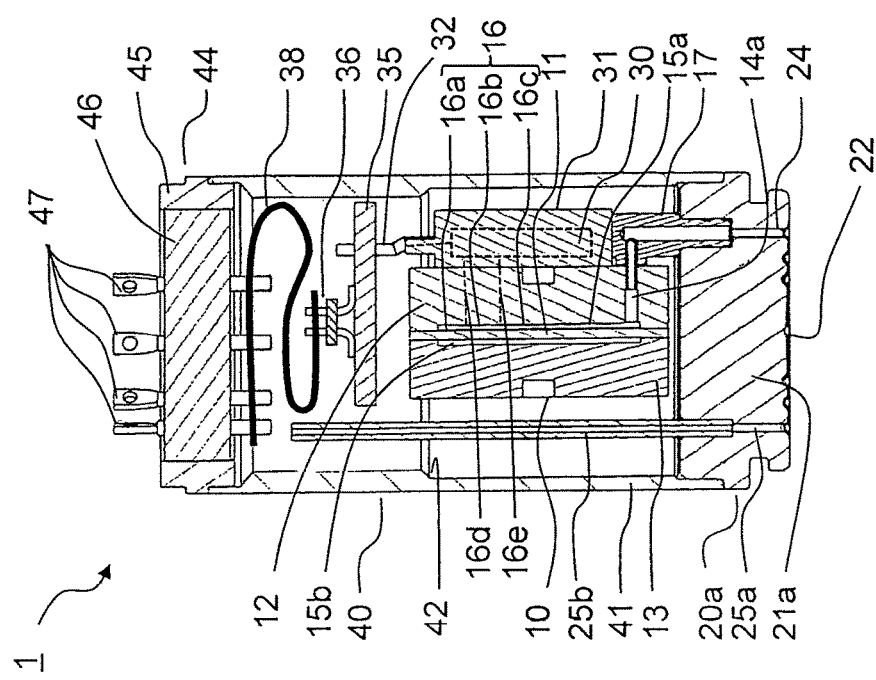

PRESSURE MEASURING DEVICE

TECHNICAL FIELD

The present invention relates to a pressure measuring device. Pressure measuring devices of the field of the invention comprise an essentially cylindrical pressure measuring cell, an essentially cylindrical housing, and an electronic circuit. The pressure measuring cell has at least one circular disk shaped measuring membrane and at least one platform, and a first pressure chamber formed between the measuring membrane and the platform, which is contactable with a pressure via a pressure duct, which extends through the platform. The pressure measuring cell has an electrical transducer for transducing a pressure dependent deflection of the measuring membrane into an electrical, primary signal, wherein the housing has in its interior a measuring cell chamber, with the pressure measuring cell is arranged in the measuring cell chamber. The housing has on an end face a pressure receipt opening, wherein the pressure duct of the pressure measuring cell communicates with the pressure receipt opening and via this is loadable with a media pressure present at the pressure receipt opening, wherein the electronic circuit is provided for operating the electrical transducer of the pressure measuring cell, and for processing the electrical, primary signal, wherein the electronic circuit is arranged in the housing and electrically connected with the transducer via at least one connecting line.

BACKGROUND DISCUSSION

A pressure measuring device of the field of the invention is disclosed, for example, in European Patent EP 1 128 172 B1. The pressure measuring device disclosed there includes a pressure measuring cell in a housing, wherein the pressure measuring cell is oriented essentially coaxially with the housing, and wherein the pressure chamber of the pressure measuring cell is contactable with a media pressure via the pressure duct and a hydraulic path of a pressure transfer means. The pressure measuring cell includes a capacitive transducer whose electrodes are arranged in the pressure chamber and, thus, are surrounded by the pressure transfer liquid. This protects the electrodes in the case of application of the pressure measuring device as a relative pressure sensor against moisture influences that it would be exposed to in the case of an arrangement outside of the pressure chamber. At least one electrode of the capacitive transducer, which is arranged on the platform opposite the measuring membrane, is contacted via an electrical cable, which—same as the pressure duct—leaves on that end of the platform, which faces away from the measuring membrane and toward the pressure transfer means.

Insofar as the capacitance dependent primary signals are sensitive to disturbances, the primary signals must be conditioned as near as possible to the electrodes by a preprocessing circuit. Therefore, between a platform of the pressure transfer means and that of the pressure measuring cell, sufficient space must be provided for such a preprocessing circuit. Moreover, between the lateral surface of the pressure measuring cell and the housing wall, sufficient space must remain, in order to lead the connection lines for the preprocessing circuit past the pressure measuring cell to a main electronics.

Therefore, in the case of a given size of the pressure measuring cell, the housing must be sufficiently large, or, in the case of a given housing size, the pressure measuring cell must be sufficiently small, in order to satisfy the above requirements.

The enlarged separation between the pressure measuring cell and the body of the pressure transfer mean, effects, in addition to the associated greater amount of hydraulic transfer liquid, a contribution to a temperature dependent measurement error. Additionally, it contributes to a hydrostatic measurement error, which depends both on position as well as also on temperature.

SUMMARY OF THE INVENTION

It is, consequently, an object of the present invention to provide a pressure measuring device, which overcomes the described disadvantages.

The object is achieved a pressure measuring device comprising: an essentially cylindrical pressure measuring cell; wherein the pressure measuring cell has at least one circular disk shaped measuring membrane and at least one platform, wherein there is formed between the measuring membrane and the platform a first pressure chamber, which is contactable with a pressure via a pressure duct, which extends through the platform, wherein the pressure measuring cell has an electrical transducer for transducing a pressure dependent deflection of the measuring membrane into at least one pressure dependent, electrical, primary signal; an essentially cylindrical housing, wherein the housing has in its interior a measuring cell chamber, wherein the pressure measuring cell is arranged in the measuring cell chamber, wherein the housing has on an end face a pressure receipt opening, wherein the pressure duct of the pressure measuring cell communicates with the pressure receipt opening and via this is loadable with a media pressure present at the pressure receipt opening; and a first electronic circuit for operating the electrical transducer of the pressure measuring cell, and for processing the electrical, primary signal, and for outputting a measurement signal dependent on the primary signal, wherein the first electronic circuit is arranged in the housing and electrically connected with the transducer via at least one connecting line; wherein according to the invention the cylinder axis of the pressure measuring cell forms with the cylinder axis of the housing an angle, which amounts to not less than 80°, preferably not less than 85°, and which is especially preferably a right angle.

In a further development of the invention, the pressure measuring device includes an isolating diaphragm, which is connected at the end of the housing along a peripheral edge pressure-tightly with the housing to form a pressure receiving chamber between the housing and the isolating diaphragm, wherein the pressure receipt opening opens into the pressure receiving chamber, and a hydraulic path, which extends from the pressure receiving chamber through the pressure receipt opening and the pressure duct to the pressure chamber of the pressure measuring cell, in order to transfer the pressure present on the isolating diaphragm into the pressure chamber.

In a further development of the invention, the transducer is a capacitive transducer and has at least a first electrode, which is arranged on the measuring membrane, and at least a second electrode, which is arranged on the platform, wherein the capacitance between the first electrode and the second electrode is pressure dependent.

In a further development of the invention, the transducer is contacted via electrical leads through the platform, wherein the electrical leads leave the platform at an end face of the platform facing away from the measuring membrane.

In a further development of the invention, the pressure duct likewise leaves the platform at the end face of the platform facing away from the measuring membrane.

In a further development of the invention, the pressure measuring device further includes a second electronic circuit, which is connected to the first electronic circuit, in order to receive and to process the measurement signal, and which is arranged in the housing at the side of the measuring cell facing away from the pressure input opening.

In a further development of the invention, the second electronic circuit issues at a signal output an output signal dependent on the measurement signal, wherein the signal output is connected to a signal path, wherein the housing has a signal path opening, through which the signal path extends.

In a further development of the invention, the signal path opening is arranged at the end of the housing facing away from the pressure input opening.

In a further development of the invention, the pressure measuring cell further includes a second platform, wherein the measuring membrane is arranged between the first platform and the second platform, wherein a second pressure chamber is formed between the measuring membrane and the second platform, wherein the second pressure chamber is evacuated or is contactable with atmospheric pressure via a second pressure duct, which extends through the second platform.

In a further development of the invention, the outer diameter of the pressure measuring cell amounts especially to not less than 80%, especially not less than 90%, of the outer diameter of the housing in the axial section of the measuring cell chamber.

In a further development of the invention, the pressure measuring device further includes a support body, wherein the support body is arranged in the housing and pressure bearingly connected with the housing, wherein the pressure measuring cell is held by the support body and is connected pressure bearingly with it, wherein there extends through the support body a connecting duct, which is connected pressure-tightly respectively to the pressure input opening and to the pressure duct.

In a further development of the invention, the connecting duct includes a first section and a second section, which are connected with one another and comprise bores communicating with one another in the support body, and which extend essentially perpendicularly to one another.

In a further development of the invention, the support body comprises at least a first spigot shaped connection piece, through which the connecting duct extends, wherein the connection piece is arranged, and pressure bearingly joined, in a bore in the platform, through which the pressure duct extends.

In a further development of the invention, at least one platform includes on its end face facing away from the measuring membrane at least sectionally a chamfer, whose maximum cross sectional area amounts to not less than 0.5% especially not less than 2%, preferably not less than 4%, and further preferably not less than 6% of the square of the axial dimension of the platform.

BRIEF DESCRIPTION OF THE DRAWINGS

The invention will now be explained based on the examples of embodiments shown in the drawing, the figures of which show as follows:

FIG. 2a is a longitudinal section through a second example of an embodiment of a pressure measuring device of the invention; and FIG. 2b is a cross section through the second example of an embodiment as shown in FIG. 2a.

DETAILED DISCUSSION IN CONJUNCTION WITH THE DRAWINGS

Figure 1B:
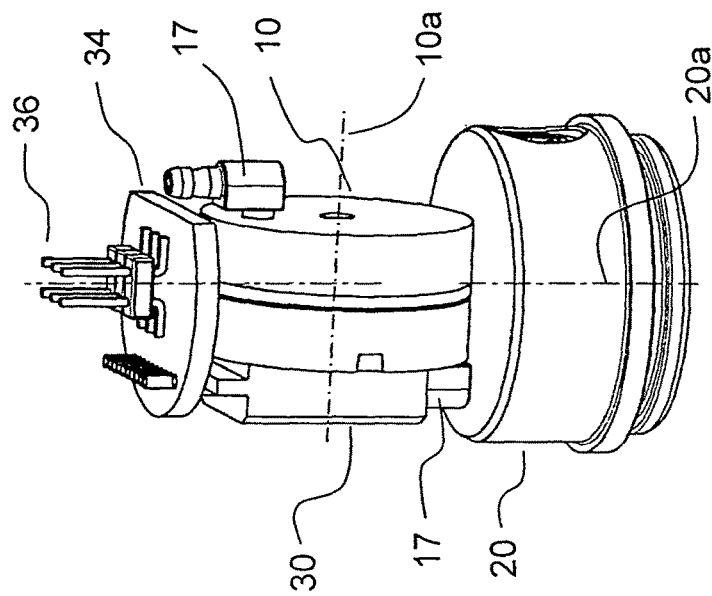
FIG. 1b is a perspective view of components of FIG. 1a in the assembled state.
Figure 1A:
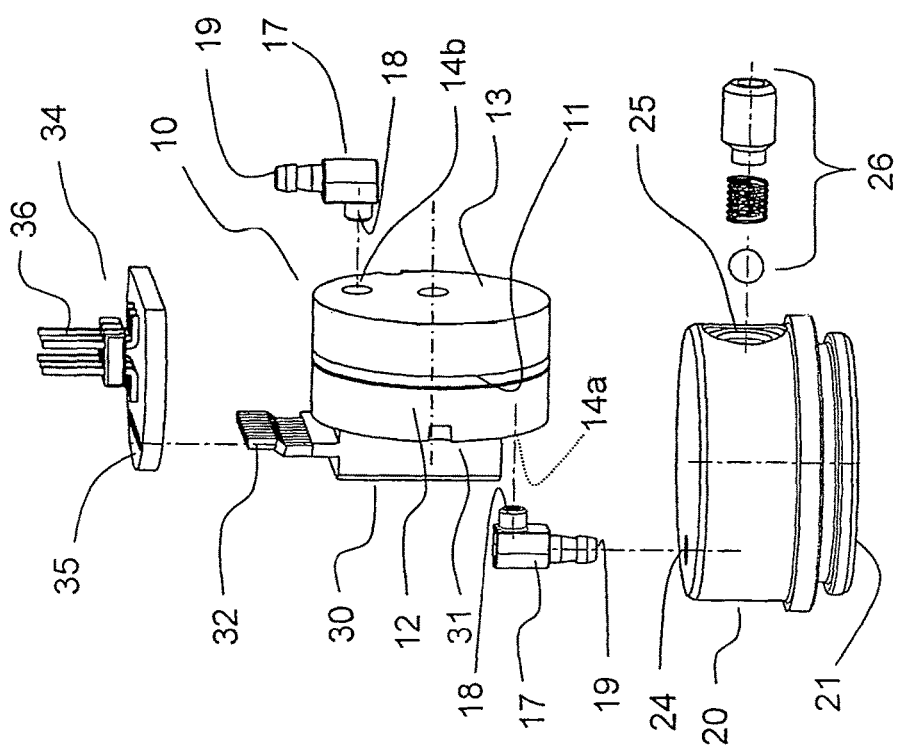
FIG. 1a is an exploded view of components of a first example of an embodiment of a pressure measuring device of the invention.

A first example of an embodiment of the invention will be explained based on FIGS. 1a and 1b, wherein for the arrangement of components in the pressure measuring device, from time to time, reference will be made incidentally to FIGS. 2a and 2b.

A pressure measuring cell 10 of the first example of an embodiment of a pressure measuring device of the invention includes a circular disk shaped measuring membrane 11 as well as first and second, circularly plate shaped platforms 12, 13, having a greater bending stiffness than the measuring membrane 11. The platforms 12, 13 and the measuring membrane are made of a ceramic material, especially corundum, wherein the measuring membrane 11 is connected pressure-tightly with the two platforms, in each case, by means of a peripheral joint in the form of an active hard solder, or braze, especially a Zr—Ni—Ti active hard solder, or braze. Formed between the measuring membrane 11 and the first platform 12 is a first pressure chamber 15a, which is contactable with a pressure via a pressure duct 14a (only shown in FIG. 2a), which extends through the platform 12. Correspondingly, there is formed between the measuring membrane 11 and the second platform 13 a second pressure chamber, 15b (only shown in FIG. 2a) which is contactable with a pressure via a pressure duct 14b, which extends through the platform 13. The particular deflection of the measuring membrane 11 depends on the difference between the pressure in the first measuring chamber and that in the second measuring chamber.

Pressure measuring cell 10 further includes a capacitive transducer 16 (not illustrated here in detail) for transducing the pressure dependent deflection of the measuring membrane 11 into at least one pressure dependent, electrical, primary signal. Capacitive transducers are preferably implemented as differential capacitors having at least two capacitances of different pressure dependence, wherein the two capacitances in the case of pressure equality in both pressure chambers should have the same capacitance. For this, for example, in both pressure chambers an electrode pair can be arranged, of which, in each case, one electrode is arranged on the measuring membrane and one electrode is arranged on the platform opposite the measuring membrane. This is an established transducer circuit for pressure difference transducers, which usually have to register a comparatively small difference between two high, static pressures.

The present invention relates, however, especially to relative, respectively absolute, pressure measuring devices, in the case of which the difference between a media pressure and the surrounding atmospheric pressure, respectively vacuum, is to be registered. In this case, the capacitive transducer 16 includes preferably two capacitances with different pressure dependence in the same pressure chamber. Therewith, the capacitances are exposed to equal environmental conditions. Currently usually applied in this situation are a disk electrode 16c and an annular electrode 16b on the platform, wherein the annular electrode 16b surrounds the disk electrode 16c, and wherein their capacitance is measured, in each case, relative to a full surface membrane electrode 16a (only shown in FIG. 2a). The capacitive transducer is arranged in the first pressure chamber 15a, which is supplied with a media pressure by means of a pressure transfer liquid. In this way, the capacitances are, for example, kept free of cross sensitivities relative to humidity.

The pressure measuring device 1 further includes a pressure transfer component 20 having a pressure transfer platform 21, which has on a first end a metal isolating diaphragm 22, which is welded along a peripheral edge pressure-tightly to the platform 21, wherein the isolating diaphragm sits over a pressure input opening of a duct 24, which extends through the platform 21.

Pressure measuring cell 10 is connected via a connection piece 17 to the pressure transfer platform, wherein connection piece 17 has a first connection spigot 18 with a first spigot duct, which is inserted into the first pressure duct 14a of the first platform 12 and joined pressure-tightly with the platform.

Connection piece 17 further includes a second connection spigot 19 with a second spigot duct, wherein the longitudinal axes of the two connection spigots 18, 19 extend perpendicularly to one another, wherein the second connection spigot 19 is inserted into the pressure input opening 24 of the platform 21 and joined pressure-tightly with the platform 21.

Connection piece 17 is composed preferably of a material, for example, Kovar, whose coefficient of thermal expansion is compatible with the coefficients of thermal expansion of the platforms. Preferably, the connection piece is composed of the same material as the platforms, namely corundum.

Connection piece 17 positions the pressure measuring cell 10 relative to the pressure transfer component 20 and holds it fixed in position. As shown in FIG. 1b, the cylinder axis 20a of the housing and of pressure transfer component 20, forms a right angle with the axis 10a of the pressure measuring cell.

The connection piece completes a pressure-tightly sealed volume between the isolating diaphragm 22 and the measuring membrane 11, which defines a hydraulic path, via which the measuring membrane can be supplied with the pressure present on the isolating diaphragm 22.

The hydraulic path is filled with a pressure transfer liquid through a passageway 25 in the platform 21 extending from the lateral surface of the platform radially inwards and communicating with the hydraulic path, wherein the opening of the passageway 25 is sealed pressure-tightly after the filling with a closure 26, which includes a sealing sphere, a bias spring and a set screw.

FIG. 2a shows based on another embodiment of a pressure transfer component 20a an alternative for the forming of the filling opening, in the case of which a filling opening 25a extends in the axial direction through a platform 21a, wherein a capillary tube 25b is inserted into the filling opening 25a and soldered to the platform 21a. After the filling of the hydraulic path, capillary tube 25b is closed pressure-tightly, for example, through pinching and subsequent welding of the capillary tube 25b. Apart from this variation, the example of an embodiment shown in FIGS. 2a and 2b corresponds essentially to the example of an embodiment presented in FIGS. 1a and 1b.

In order to operate the pressure measuring cell 10 as a relative pressure measuring cell, a reference air supply is required, for which a first connection spigot of a second connecting piece 17 is inserted into the pressure duct 14b of the second platform 13 and joined pressure-tightly with the second platform 13. The second connecting piece is essentially of equal construction with the first connecting piece 17, wherein a reference-air line (not shown), for example, a reference air hose, is connected to the second connection spigot of the second connection body 17.

Arranged furthermore in the housing can be a drying body, which comprises, for example, zeolite or silica gel in an organic matrix of, for example, PFA, PTFE, silicone or other polymers. Suitable materials for such drying bodies are described in the German patent applications 102010038986, 102010062295 and 102011080142.

The pressure measuring device further includes a circuit component 30, which has an electronic circuit for operating the capacitive transducer, for processing the primary signals of the capacitive transducer 16, and for outputting a measurement signal dependent on the primary signal. The measurement signal can especially be a digital signal. The electronic circuit is housed in a hermetically sealed, ceramic capsule 31, which, in turn, is arranged on the outer face of the platform 12, wherein the electronic circuit is connected to the electrodes of the capacitive transducer via electrical leads 16d, 16e extending through the capsule 31 and the first platform 12.

The circuit component 30 further includes a row of first contact pins 32, onto which a connector module 34 is plugged, which includes a circuit board and second contact pins 36 with greater spacing than the first contact pins.

Further description will now be with reference to FIGS. 2a and 2b.

The pressure measuring device of the invention 1 further includes a housing 40, which comprises a cylindrical, metal housing tube 41, a metal pressure transfer platform 21 as media-side housing closure and furthermore a media far housing closure 44.

Housing tube 40 is placed on the platform 21 and welded pressure-tightly to such along a peripheral weld seam, wherein the end of the housing tube 41 facing away from the platform 21 is sealed shut by welding to a housing closure 44, so that the housing 40 forms a closed measuring cell chamber around the pressure measuring cell 10 and the circuit component 30 as well as the connector module 34.

Housing closure 44 comprises a metal collar 45 and a glass body 46 seated pressure-tightly and pressure bearingly in the metal collar 45, wherein contacts 47 and a reference air duct (not shown) extend through the glass body.

Contacts 47 are connected via a flexible flat cable 38 with the second contact pins 36.

The reference air duct is connected via a reference air hose to the second connection spigot of the second connection piece 17. The mentioned components of the reference air path are, however, for sake of perspicuity, not shown in FIG. 2a.

The measuring cell chamber can, in given cases, be filled with a soft potting compound or a foam, respectively contain one or more plastic molded parts, for damping vibrations of the measuring cell 10 occurring in given cases.

As shown in FIG. 2a, the inner wall of the housing tube includes at least one step 42, so that the measuring cell chamber in the axial section, in which the pressure measuring cell 10 is arranged, has a greater inner diameter. In this way, the pressure measuring cell 10 is given sufficient space, such as is shown in the cross section in FIG. 2b, which lies in the plane of greatest extension of the pressure measuring cell.

Further placed on the housing 40 can be an electronics housing (not shown), in which a so called main electronics is arranged, which supplies the circuit component 30 with energy, and conditions its signals, for example, in order to provide a measured value dependent, electrical current signal (4 . . . 20 mA) or a digital signal in one of the established fieldbus-protocols.

In given cases, the main electronics can also be integrated in the housing 40, for which then a greater housing volume is required, which can be provided, for example, by lengthening the housing tube 41. In this case, the housing 40 can bear, bordering on the glass body, a terminal block in galvanic contact with the contacts 47, wherein the pressure measuring device can be connected via the terminal block to a control system.

The invention claimed is:

1. A pressure measuring device, comprising:
   an essentially cylindrical pressure measuring cell, which has at least one circular disk shaped measuring membrane, at least one platform;
   a pressure duct;
   a first pressure chamber formed between said measuring membrane and said platform, which is contactable with a pressure via said pressure duct, which extends through said platform;
   a second pressure chamber;
   said pressure measuring cell has an electrical transducer for transducing a pressure dependent deflection of said measuring membrane into at least one pressure dependent, electrical, primary signal;
   a first electronic circuit;
   a second electronic circuit; and
   an essentially cylindrical housing, said housing having in its interior a measuring cell chamber, and said housing having an outer diameter, wherein:
   said pressure measuring cell is arranged in said measuring cell chamber, said pressure measuring cell having an outer diameter;
   said housing has on an end face a pressure receipt opening,
   said pressure duct of said pressure measuring cell communicates with said pressure receipt opening and via said opening is loadable with a media pressure present at said pressure receipt opening, and
   said first electronic circuit for operating electrical transducer of said pressure measuring cell, and for processing the electrical, primary signal, and for outputting a measurement signal dependent on the primary signal, and said first electronic circuit is arranged in said housing and electrically connected with the transducer via at least one connecting line; and
   the cylinder axis of said pressure measuring cell forms with the cylinder axis of said housing a right angle;
   said outer diameter of said pressure measuring cell amounts to not less than 80% of said outer diameter of said housing in an axial section of said measuring cell chamber, where the measuring cell is located;
   said second pressure chamber is contactable with atmospheric pressure via a second pressure duct, which extends through a second platform;
   the pressure measuring device further comprises, a single isolating diaphragm, which is connected at the end of said housing along a peripheral edge pressure-tightly with said housing to form a pressure receiving chamber between said housing and said isolating diaphragm, wherein:
   said pressure receipt opening opens into said pressure receiving chamber, and a hydraulic path, which extends from said pressure receiving chamber through said pressure receipt opening and said pressure duct to said first pressure chamber of said pressure measuring cell, in order to transfer the pressure present on said isolating diaphragm into said first pressure chamber;
   the second electronic circuit, is connected to said first electronic circuit, in order to receive and to process the measurement signal, and which is arranged in said housing at the side of said measuring cell facing away from said pressure receipt opening;
   said second electronic circuit issues at a signal output an output signal dependent on the measurement signal, and the signal output is connected to a signal path, wherein said housing has a signal path opening, through which the signal path extends; and
   the signal path opening is arranged at the end of said housing facing away from said pressure receipt opening.

2. The pressure measuring device as claimed in claim 1, wherein:
   said transducer is a capacitive transducer has at least a first electrode, which is arranged on said measuring membrane, and at least a second electrode, which is arranged on said first platform; and
   the capacitance between said first electrode and said second electrode is pressure dependent.

3. The pressure measuring device as claimed in claim 1, wherein:
   said transducer is contacted via electrical leads through said first platform;
   the electrical leads leave said first platform at an end face of said first platform facing away from said measuring membrane.

4. The pressure measuring device as claimed in claim 3, wherein:
   said pressure duct leaves said platform at the end face of said first platform facing away from said measuring membrane.

5. The pressure measuring device as claimed in claim 1, furthermore comprising:
   a support body, wherein:
   said support body is arranged in said housing and connected with said housing;
   said pressure measuring cell is held by said support body and is connected with it; and
   there extends through said support body a connecting duct, which is connected pressure-tightly to said pressure input opening and to said pressure duct.

6. The pressure measuring device as claimed in claim 1, further comprising:
   a connecting duct; and
   a support body, wherein:
   said connecting duct includes a first section and a second section, which are connected with one another and comprise bores communicating with one another in said support body, and which extend perpendicularly to one another.

7. The pressure measuring device as claimed in claim 1, further comprising:
   a support body; and
   a connecting duct, wherein:
   said support body comprises at least a first spigot connection piece, through which said connecting duct extends;
   said connection piece is arranged, and pressure bearingly joined, in a bore in said first platform, through which said pressure duct extends.

8. The pressure measuring device as claimed in claim 1, wherein:
   the outer diameter of said pressure measuring cell amounts to not less than 90% of the outer diameter of said housing in said axial section of said measuring cell chamber.

9. The pressure measuring device as claimed in claim 1, further comprising:
   an isolating diaphragm, which is connected at the end of said housing along a peripheral edge pressure-tightly with said housing to form a pressure receiving chamber between said housing and said isolating diaphragm, wherein:
   said pressure receipt opening opens into said pressure receiving chamber; and
   a hydraulic path, which extends from said pressure receiving chamber through said pressure receipt opening and said pressure duct to said pressure chamber of said pressure measuring cell, in order to transfer the pressure present on said isolating diaphragm into said pressure chamber.

10. The pressure measuring device as claimed in claim 1, wherein:
    said pressure measuring cell further includes a second platform;
    said measuring membrane is arranged between said first platform and said second platform;
    a second pressure chamber is formed between said measuring membrane and said second platform; and
    said second pressure chamber is evacuated or is contactable with atmospheric pressure via a second pressure duct, which extends through said second platform.

11. The pressure measuring device as claimed in claim 1, wherein:
    the outer diameter of said pressure measuring cell amounts to not less than 90% of the outer diameter of said housing in the axial section of said measuring cell chamber.

\* \* \* \* \*